(12) United States Patent
Detournay et al.

(10) Patent No.: US 9,139,447 B2
(45) Date of Patent: Sep. 22, 2015

(54) PROCESS FOR THE PRODUCTION OF SODIUM BICARBONATE

(75) Inventors: Jean-Paul Detournay, Brussels (BE); Francis M. Coustry, Alsemberg (BE); Alessandra Pastacaldi, Rosignano Solvay-Livorno (IT)

(73) Assignee: SOLVAY (SOCIETE ANONYME), Brussels (BE)

( * ) Notice: Subject to any disclaimer, the term of this patent is extended or adjusted under 35 U.S.C. 154(b) by 1810 days.

(21) Appl. No.: 12/305,444

(22) PCT Filed: Jul. 9, 2007

(86) PCT No.: PCT/EP2007/056935
§ 371 (c)(1),
(2), (4) Date: Dec. 18, 2008

(87) PCT Pub. No.: WO2008/003787
PCT Pub. Date: Jan. 10, 2008

(65) Prior Publication Data
US 2009/0288957 A1   Nov. 26, 2009

(30) Foreign Application Priority Data
Jul. 7, 2006  (EP) .................................... 06116791

(51) Int. Cl.
*B01D 61/44*  (2006.01)
*C01D 7/34*  (2006.01)

(52) U.S. Cl.
CPC . *C01D 7/34* (2013.01); *B01D 61/44* (2013.01)

(58) Field of Classification Search
USPC .................................................. 204/537, 538
See application file for complete search history.

(56) References Cited

U.S. PATENT DOCUMENTS

| 4,238,305 | A | * | 12/1980 | Gancy et al. ................... 204/538 |
| 4,584,077 | A | * | 4/1986 | Chlanda et al. ............... 204/534 |
| 6,221,225 | B1 | | 4/2001 | Mani |
| 6,924,318 | B2 | | 8/2005 | Mischi et al. |

FOREIGN PATENT DOCUMENTS

WO        WO 0179335 A1    10/2001

OTHER PUBLICATIONS

U.S. Appl. No. 12/811,639, Jean-Paul Detournay et al., filed Jul. 2, 2010.
U.S. Appl. No. 12/811,663, Jean-Paul Detournay et al., filed Jul. 2, 2010.
U.S. Appl. No. 12/811,643, Jean-Paul Detournay et al., filed Jul. 2, 2010.

* cited by examiner

*Primary Examiner* — Arun S Phasge
(74) *Attorney, Agent, or Firm* — Beatrice C. Ortego

(57) ABSTRACT

Process for the joint production of sodium carbonate and sodium bicarbonate out of sesquicarbonate, in which the sesquicarbonate is dissolved in water, in order to form a feed water solution comprising both sodium carbonate and sodium bicarbonate, in which at least part of the feed water solution is introduced into all the compartments of an electrodialyser and in which a sodium bicarbonate enriched solution and a sodium carbonate enriched solution are extracted from the compartments.

12 Claims, No Drawings

PROCESS FOR THE PRODUCTION OF SODIUM BICARBONATE

CROSS-REFERENCE TO RELATED APPLICATIONS

The present application is a U.S. national stage application under 35 U.S.C. §371 of International Application No. PCT/EP2007/056935 filed Jul. 9, 2007, which claims priority benefit to European patent application EP 06116791.2 filed on Jul. 7, 2006, these applications being herein incorporated by reference in their entirety for all purposes.

The invention concerns the production of sodium bicarbonate out of trona.

Trona is a natural ore made essentially of sodium sesquicarbonate which itself consists of sodium carbonate, sodium bicarbonate and water ($Na_2CO_3$, $NaHCO_3$, $2H_2O$). Trona is mostly available in Wyoming, but there are significant reserves (albeit smaller than in Wyoming) in other places in the world where the ore is already extracted (China) or where potential mines could be exploited.

Until now, the vast majority of the extracted trona is debicarbonated and purified, in order to produce and sell pure sodium carbonate. Some limited exceptions are the sale of ground trona for animal feed or flue gas treatment or the sale of sodium sesquicarbonate for animal feed.

On the other side, sodium bicarbonate is a product with a wide range of interesting properties and a very wide range of applications from high tech ingredients for the pharma industry to the human food and animal feed, and to the use in flue gas treatment. In flue gas treatment sodium bicarbonate is most likely among the most efficient chemicals for the removal of a wide range of pollutants (most notably the acidic one), and its use is limited only by the competition of less efficient but much cheaper chemicals such as lime or even limestone.

The production of sodium bicarbonate is currently almost entirely made by the carbonation of sodium carbonate. In Europe, the carbonation is usually made in situ in the soda ash plants from $CO_2$ coproduced during the production of soda ash (mainly the $CO_2$ generation in the lime kilns). In USA, the carbonation is usually made in separate plants which purchase independently the soda ash and the $CO_2$ and combine them.

Because of the nature of this most important process for the bicarbonate production, the price for bicarbonate is above the price of the soda ash. With such economics the uses of bicarbonate will always be limited by the competition of cheaper substitutes, most notably in the flue gas treatment.

The invention aims at producing bicarbonate from trona while avoiding the necessity of debicarbonating and recarbonating, thereby saving important costs and opening new applications for the sodium bicarbonate.

In consequence, the invention concerns a process for the joint production of sodium carbonate and sodium bicarbonate out of sesquicarbonate, in which:

The sesquicarbonate is dissolved in water, in order to form a feed water solution comprising sodium carbonate and sodium bicarbonate;

At least part of the feed water solution is introduced into an electrodialyser comprising at least a less basic and a more basic adjacent compartments separated by a cationic ion exchange membrane, permeable to sodium ions, the compartments being placed between a positive and a negative electrode;

A sodium bicarbonate enriched solution is extracted from the less basic compartment and a sodium carbonate enriched solution is extracted from the more basic compartment.

The process according to the invention allows to separate, with the highest possible technical efficiency, the sesquicarbonate directly into its components, soda ash and sodium bicarbonate, without any of the usual steps of debicarbonation and recarbonation. That should ensure a much reduced production cost for the sodium bicarbonate, and even possibly a slightly reduced production cost for the soda ash.

The sesquicarbonate can have different origins. It can be produced artificially out of different sodium sources. However, it is particularly interesting that sesquicarbonate derives from a natural trona ore. In this embodiment treatment of the feed solution will in general be necessary, in order to purify it from the main impurities contained in the ore.

In the process according to the invention, the feed water solution can be formed by dissolution in water, in the industrial production plant, of solid trona ore extracted from the mine. The water can be fresh water. However it is usually preferred that the water is a recycled water solution already containing alkalis, coming from the process according to the invention or from other processes. The water can also comprise mother liquors (crystallization waters) produced downstream of the process according to the invention, when sodium carbonate and bicarbonate are crystallized, for instance.

The process is however especially suited when the feed water solution is a mine water. By mine water is understood the water solution which is formed when water is directly injected into the trona ore deposits, whereby, on contact with the ore, an aqueous solution is enriched in sodium sesquicarbonate. Solid trona can be additionally dissolved in the water solution, in order to increase its alkali concentration. The aqueous solution enriched on contact with the ore deposit is commonly referred to as mine water.

In a preferred embodiment of the process, the less basic and more basic compartments of the electrodialyser are separated by an alternation of cationic and bipolar membranes. In this embodiment, each compartment is thus delimited on one side by a cationic membrane, and on the other side by a bipolar membrane.

A bipolar membrane is an ion exchange membrane comprising one cationic face—permeable for the cations and impermeable for the anions and an other anionic face—permeable for the anions and impermeable for the cations. Such membrane can be produced by the juxtaposition of two monopolar membranes. Under a sufficient electric field, and in aqueous solution, the only possible reaction is the splitting of water at the interface between the two monopolar membranes into $H^+$ and $OH^-$ which then cross respectively the cationic and anionic monopolar membrane and exit the membrane into the adjacent compartments. It is recommended that the bipolar membranes are produced by the process as described in the patent application WO01/79335 in the name of SOLVAY, in particular as described in its claims.

The less basic compartments, which are enriched in sodium bicarbonate, receive $H^+$ ions and the more basic compartments, which are enriched in sodium carbonate, receive $OH^-$ ions.

Additionally, Na+ ions are crossing the cationic membrane from the less basic to the more basic compartments.

Under a sufficient electric field (created by terminal electrodes and pointing (+ to −) from the cationic membrane to the anionic face of the bipolar membrane, and provided that all compartments are fed with a solution comprising both sodium carbonate and sodium bicarbonate, the less basic compartments will receive $H^+$ ions exiting the bipolar membrane and lose $Na^+$ ions crossing the cationic membrane. The sodium carbonate in the solution will absorb the $H^+$ ions and will be transformed into bicarbonate.

If the feedstock of solution is adequately adjusted to the transport of $H^+$ and $Na^+$, all the carbonate can be transformed into bicarbonate, and a solution of pure bicarbonate can be produced in the less basic compartments. Preferably if the pH of the existing solution is kept above 7, no $H^+$ will be available in the solution to compete with the $Na^+$ in the crossing of the cationic membrane, and no $CO_2$ will be generated in the compartment (provided the temperature in the cell is kept sufficiently low).

In the more basic compartment, a supply of $Na^+$ (from the cationic membrane) and of $OH^-$ (from the bipolar membrane) will happen, and all the bicarbonate in the trona can be transformed into carbonate. If the flow rate of the feed solution is adequate, no excess "free" caustic soda will be created, and a solution of pure carbonate can be produced preferably at a pH not higher than 10 or 11.

Solid carbonate and bicarbonate can then be obtained from their solutions by classical means (evaporation, crystallization by cooling, . . . ). To that end it is recommended that both the feed water solutions and the enriched water solutions are sufficiently concentrated.

To this end (part of) the enriched water solution can be mixed in the electrodialyzer with the feed waters solutions in order to be further enriched. The different compartments of the electrodialyzer will be generally treated separately in order to optimize separately the carbonate and bicarbonate concentrations.

In a recommended embodiment, the feed water solution comprises at least 100 g/kg preferably 110 g/kg more preferably 120 g/kg sodium carbonate and at least 30 g/kg preferably 35 g/kg sodium bicarbonate.

It is further recommended that, on the one side, the sodium carbonate enriched water solution contains at least 150 g/kg preferably 160 g/kg sodium carbonate and less than 20 g/kg preferably 10 g/kg sodium bicarbonate and that, on the other side, the sodium bicarbonate enriched water solution contains at least 80 g/kg preferably 90 g/kg most preferably 100 g/kg sodium bicarbonate and less than 80 g/kg preferably 70 g/kg most preferably 50 g/kg sodium carbonate. It is preferable that the temperature of the enriched water solution, in particular the sodium bicarbonate enriched water solution, is kept above 50° C., preferably 60° C., most preferably 70° C., in order to avoid precipitation of sodium bicarbonate in the electrodialyser. Temperatures not exceeding 80° C. are recommended.

In another recommended embodiment, the enriched water solution of sodium carbonate can further be saturated with calcined trona and feed the existing soda ash evaporation unit of an existing soda ash production plant. In this embodiment, less calcined trona is needed for the same production of soda ash and some existing trona calciners can be shut down or reused for the sale of other product.

The solution of sodium bicarbonate can be cooled to crystallize the sodium bicarbonate, and the cooled solution can be reheated and reused for the saturation with fresh trona, and then fed back into the compartments.

The remaining liquid streams (if any) are also advantageously reused upstream for trona dissolution.

The liquids in the less basic and more basic compartments contain preferably very few "free" $H^+$ and $OH^-$ ions and will have both very similar and "neutral" pH within 6 to 12. In particular, it is preferred that the pH in the less basic compartment is above 7. It is also recommended that the pH in the more basic compartment is below 11.

When nearly pure enriched carbonate and bicarbonate water solutions are desired, it is however possible that some possible leaks across the compartments may cause to have a small quantity of bicarbonate in the carbonate solution or a small quantity of carbonate in the bicarbonate. In any such case, it will remain very easy downstream to adjust the operations for the presence of these impurities and the final products will not be affected by the existence of mechanical leaks within or around the cells between the compartments.

When nearly pure sodium bicarbonate solutions are desired, means for handling precipitation of sodium bicarbonate inside the electrodialyser will be necessary, in view of the low solubility of the bicarbonate.

Because the products can be produced directly from the feedstock solution, electrodialysers with only two types of compartments are needed ("two compartments electrodialysers"). Compared to other processes, where the final products could not be left with the co-ions of the feedstock solution (i.e. $Cl^-$ in NaOH in the electrodialysis of NaCl into NaOH and HCl) and where a third compartment and a third membrane (anionic membrane) are requested, the cell according to the invention is much more simple to design and operate.

In the mechanism as described before, when 1 Faraday cross the membrane, 212 r grams of soda ash and 168 r grams of bicarbonate can ideally be produced out of sesquicarbonate, where r is the current efficiency of the cell (r=1 if no loses or leaks occur).

The process according to the invention is particularly adapted to the coproduction of soda ash and sodium bicarbonate in a tonnage ratio equal to the mass ratio of sodium carbonate and sodium bicarbonate in the extracted trona (i.e. 0.79 kg bicar/kg soda ash).

While the concept of the invention has particular economical impact in the sodium carbonate and bicarbonate industry, it is not technically limited to this industry. Similar processes can be derived for other metallic cations, as potassium or nitrogen, as well as for other non metallic anions as phosphates or sulphates, for instances, as well as anions from other acids and oxacids.

In consequence, the invention concerns also a process for the separation of at least two salts from the same non metallic anion, the two salts having different pH, in which:

The at least two salts are dissolved in water to form a feed water solution

At least part of the feed water solution is introduced in each compartments of an electrodialyser comprising an alternation of less basic and more basic compartments, separated by an alternation of cationic and bipolar ion exchange membranes, placed between a positive and a negative electrode A solution enriched in the salt with the lowest pH is extracted from the less basic compartment and a solution enriched in the salt with the highest pH is extracted from the more basic compartment.

EXAMPLE 1

Mine water having the following composition (besides trace remaining impurities):

| | |
|---|---|
| NaCl | 4 g/kg |
| NaHCO3 | 35 g/kg |
| Na2CO3 | 135 g/kg |
| H2O | 826 g/gk | is fed at a temperature of 59° C. into all compartments of a two compartments electrodialyser comprising bipolar membranes produced by ASTOM, model neosepta BP-1E and cationic membranes Nafion®324, produced by DuPont. A current density of 1 kA/m2 was applied to the elementary cell and a tension of 1,4 V was observed. The sodium carbonate enriched solution contained 160 g/kg of sodium carbonate and 5 g/kg of sodium bicarbonate. The sodium bicarbonate enriched solution contained 95 g/kg of sodium bicarbonate and 70 g/kg of sodium carbonate. The electrical power consumption for one ton of total produced product (sodium bicarbonate+sodium carbonate) was 110 kWh/ton. A current efficiency of 90% was calculated, based on the weight of the products and the Faraday law.

EXAMPLE 2

In example 2 it was proceeded as in example 1 except that the mine water had the following composition (besides trace remaining impurities):

| | |
|---|---|
| NaCl | 4 g/kg |
| NaHCO3 | 50 g/kg |
| Na2CO3 | 105 g/kg |
| H2O | 841 g/gk |

The sodium carbonate enriched solution contained 150 g/kg of sodium carbonate and 5 g/kg of sodium bicarbonate. The sodium bicarbonate enriched solution contained 120 g/kg of sodium bicarbonate and 25 g/kg of sodium carbonate. The observed tension was 1.3 Volt at a current density of 1 kA/m$^2$. After 90 minutes of production, 6.5 kg of bicarbonate and 12.4 kg of sodium carbonate solutions were extracted from their respective compartments. The current efficiency was thus 85%. The power consumption was 110 kWh/ton.

The invention claimed is:

1. A process for the joint production of sodium carbonate and sodium bicarbonate out of sesquicarbonate, comprising:
   dissolving the sesquicarbonate in water, in order to form a feed water solution comprising both sodium carbonate and sodium bicarbonate;
   introducing at least a part of the feed water solution into an electrodialyser comprising at least one less basic and one more basic adjacent compartments separated by a cationic ion exchange membrane, permeable to sodium ions, the compartments being placed between a positive electrode and a negative electrode; and
   extracting a sodium bicarbonate enriched solution from the less basic compartment; and
   extracting a sodium carbonate enriched solution from the more basic compartment.

2. The process according to claim 1 wherein the sesquicarbonate derives from trona ore.

3. The process according to claim 2 wherein the feed water solution is a minewater.

4. The process according to claim 1 wherein the less basic and more basic compartments are separated by an alternation of cationic and bipolar membranes.

5. The process according to claim 1 wherein the feed water solution comprises at least 100 g/kg sodium carbonate and at least 30 g/kg sodium bicarbonate.

6. The process according to claim 5 wherein the sodium carbonate enriched water solution contains at least 150 g/kg sodium carbonate and less than 20 g/kg sodium bicarbonate.

7. The process according to claim 5 wherein the sodium bicarbonate enriched water solution contains at least 80 g/kg sodium bicarbonate and less than 80 g/kg sodium carbonate.

8. The process according to claim 1 wherein the pH in the less basic compartment is controlled at a value above 7.

9. The process according to claim 1 wherein the pH in the more basic compartment is controlled at a value under 12.

10. The process according to claim 1 wherein the temperature in the less basic compartment is comprised between 50 and 80° C.

11. The process according to claim 1 wherein solid sodium carbonate and sodium bicarbonate are crystallized out of their respective enriched water solutions.

12. A process for the separation of at least two salts from the same non metallic anion, the two salts having different pH, comprising:
   dissolving the at least two salts in water to form a feed water solution;
   introducing at least a part of the feed water solution in each compartments of an electrodialyser comprising an alternation of less basic and more basic compartments, separated by an alternation of cationic and bipolar ion exchange membranes, placed between a positive electrode and a negative electrode; and
   extracting a solution enriched in the salt with the lowest pH from the less basic compartment and extracting a solution enriched in the salt with the highest pH from the more basic compartment.

* * * * *